US008825811B2

(12) United States Patent
Gonzales et al.

(10) Patent No.: US 8,825,811 B2
(45) Date of Patent: Sep. 2, 2014

(54) CONNECTION MANAGEMENT AND OPTIMIZATION FOR SERVICES DELIVERED OVER NETWORKS

(75) Inventors: Cesar A. Gonzales, Katonah, NY (US); Kang-Won Lee, Nanuet, NY (US); Sumedh W. Sathaye, Austin, TX (US); Dinesh Verma, New Castle, NY (US); Peter Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/421,371

(22) Filed: Mar. 15, 2012

(65) Prior Publication Data

US 2013/0246577 A1    Sep. 19, 2013

(51) Int. Cl.
*G06F 15/16*    (2006.01)

(52) U.S. Cl.
USPC .......................................................... 709/219

(58) Field of Classification Search
USPC .......................................................... 709/219
See application file for complete search history.

(56) References Cited

U.S. PATENT DOCUMENTS

| | | | | |
|---|---|---|---|---|
| 6,057,847 | A * | 5/2000 | Jenkins | 345/422 |
| 6,516,350 | B1 * | 2/2003 | Lumelsky et al. | 709/226 |
| 6,785,704 | B1 * | 8/2004 | McCanne | 718/105 |
| 7,133,922 | B1 | 11/2006 | She et al. | |
| 7,430,222 | B2 | 9/2008 | Green et al. | |
| 7,467,400 | B1 * | 12/2008 | Moss et al. | 726/3 |
| 7,577,667 | B2 * | 8/2009 | Hinshaw et al. | 1/1 |
| 7,734,730 | B2 * | 6/2010 | McCanne | 709/219 |
| 7,962,582 | B2 * | 6/2011 | Potti et al. | 709/220 |
| 2001/0052008 | A1 * | 12/2001 | Jacobus | 709/223 |
| 2002/0019843 | A1 * | 2/2002 | Killian et al. | 709/102 |
| 2004/0148420 | A1 * | 7/2004 | Hinshaw et al. | 709/231 |
| 2005/0010653 | A1 * | 1/2005 | McCanne | 709/219 |

(Continued)

FOREIGN PATENT DOCUMENTS

| | | |
|---|---|---|
| EP | 1892892 A1 | 2/2008 |
| EP | 1921824 A1 | 5/2008 |

OTHER PUBLICATIONS

"Content Delivery Networks (CDN) for Live TV Streaming," Motama, White Paper, Copyright Apr. 2011 by Motama GmBH, Saarbrucken, Germany.
Qumu VIdeoNet, Copyright 2011, Qumu, Inc.

(Continued)

*Primary Examiner* — Azizul Choudhury
*Assistant Examiner* — Tariq Najee-Ullah
(74) *Attorney, Agent, or Firm* — Thomas Grzesik; Fleit Gibbons Gutman Bongini & Bianco PL

(57) ABSTRACT

Content delivery by a network node is optimized. The network node is communicatively coupled between multiple end user devices and at least one content service provider. A request for a media streaming service available from the content service provider is intercepted from a first requestor device. It is determined if the media streaming service is registered for delivery optimization based on at least one service rule specific to the media streaming service. It is determined if a second requestor device is currently receiving the media streaming service from the content service provider. In response to the media streaming service being received by the second requestor device, delivery optimization of the media streaming service is performed by replicating the media streaming service for delivery to the first requestor device. The replicated media streaming service is sent to the first requestor device.

21 Claims, 11 Drawing Sheets

(56) References Cited

U.S. PATENT DOCUMENTS

| | | | |
|---|---|---|---|
| 2005/0076099 A1* | 4/2005 | Wang et al. | 709/219 |
| 2005/0148325 A1* | 7/2005 | Kopra et al. | 455/420 |
| 2005/0289618 A1* | 12/2005 | Hardin | 725/95 |
| 2006/0064583 A1* | 3/2006 | Birnbaum et al. | 713/164 |
| 2006/0067260 A1* | 3/2006 | Tokkonen et al. | 370/310 |
| 2006/0291412 A1* | 12/2006 | Naqvi et al. | 370/328 |
| 2007/0107025 A1 | 5/2007 | Li et al. | |
| 2007/0143807 A1 | 6/2007 | Suneya | |
| 2008/0095163 A1 | 4/2008 | Chen et al. | |
| 2008/0151807 A1 | 6/2008 | Meier et al. | |
| 2009/0070844 A1 | 3/2009 | Beer et al. | |
| 2009/0279468 A1 | 11/2009 | Kenagy | |
| 2010/0138646 A1 | 6/2010 | Aloni et al. | |
| 2010/0296427 A1 | 11/2010 | Lohr et al. | |
| 2011/0131619 A1* | 6/2011 | Hasek et al. | 725/93 |
| 2013/0246631 A1* | 9/2013 | Gonzales et al. | 709/227 |

OTHER PUBLICATIONS

"Akamai Media Delivery Streaming," Akamai Feature, Akamai Powering a Better Internet, Copyright 2011 Akamai Technologies, Inc.

Non Final Office Action dated Sep. 13, 2013 for U.S Appl. No. 13/421,418.

* cited by examiner

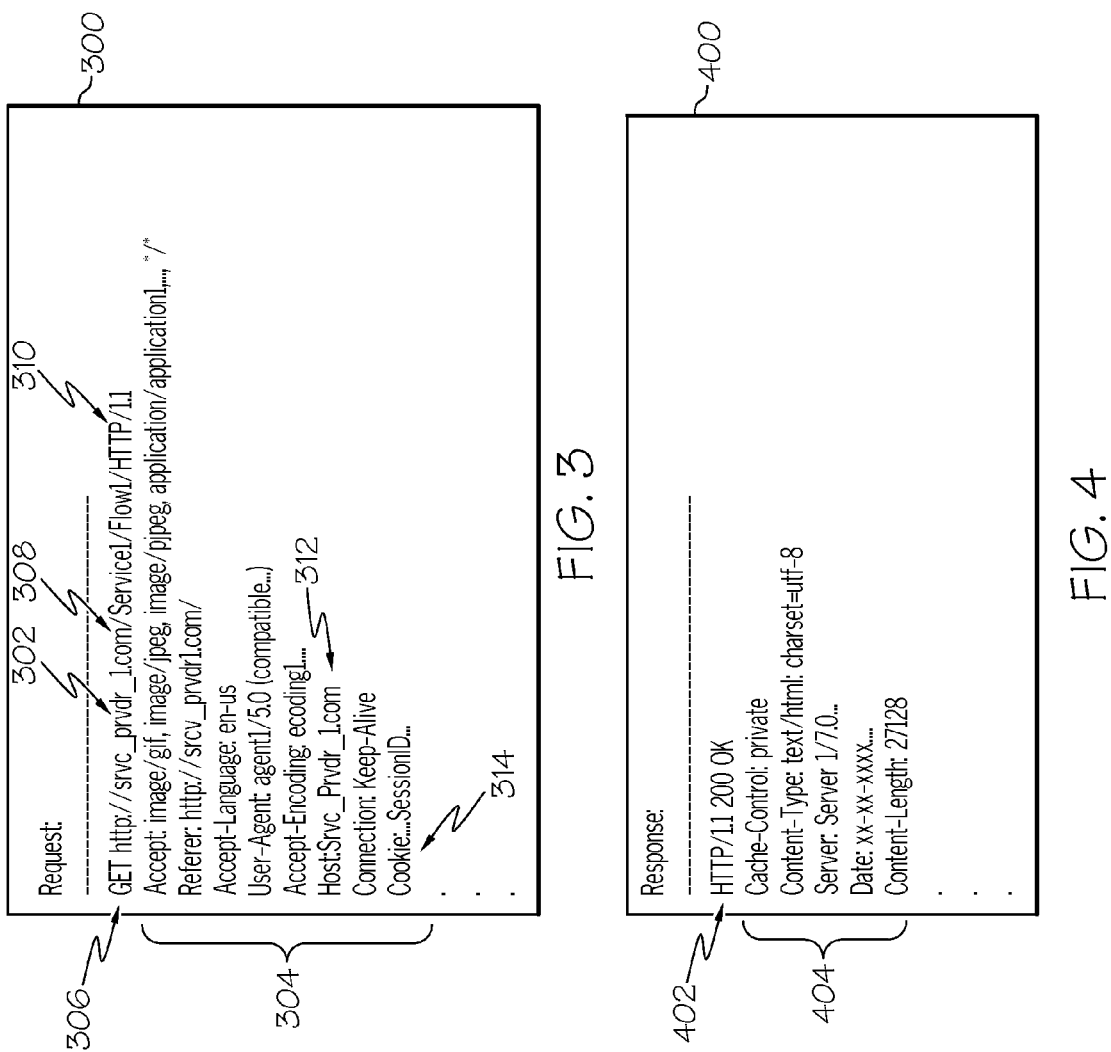

| SERVICE PROVIDER ID ~502 | SERVICE PROVIDER NAME ~506 | SERVICE PROVIDER URL ~510 | RULE SET ID ~514 | OPTIMIZATION STATUS ~518 | ... |
|---|---|---|---|---|---|
| Srvc_1 | Srvc_Prvdr_1 | Srvc_Prvdr_1.com | RS_1 | Enabled | ... |
| Srvc_2 504 | Srvc_Prvdr_2 508 | Srvc_Prvdr_3.net 512 | RS_2 516 | Enabled 520 | ... |
| Srvc_3 | Srvc_Prvdr_3 | Srvc_Prvdr_3.tv | RS_3 | Disabled 522 | ... |
| ... | ... | ... | ... | ... | ... |
| Srvc_N | Srvc_Prvdr_N | Srvc_Prvdr_N.com | RS_N | N/A | ... |

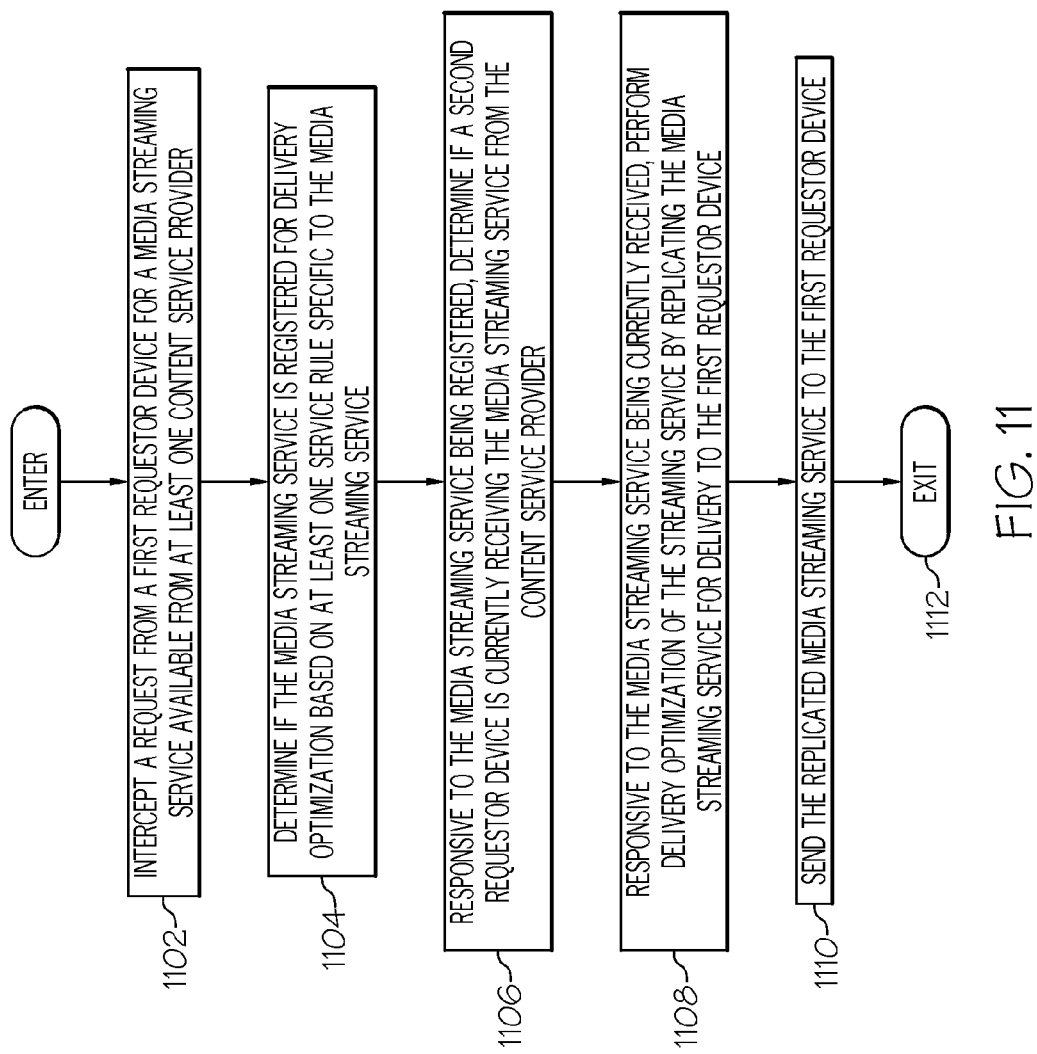

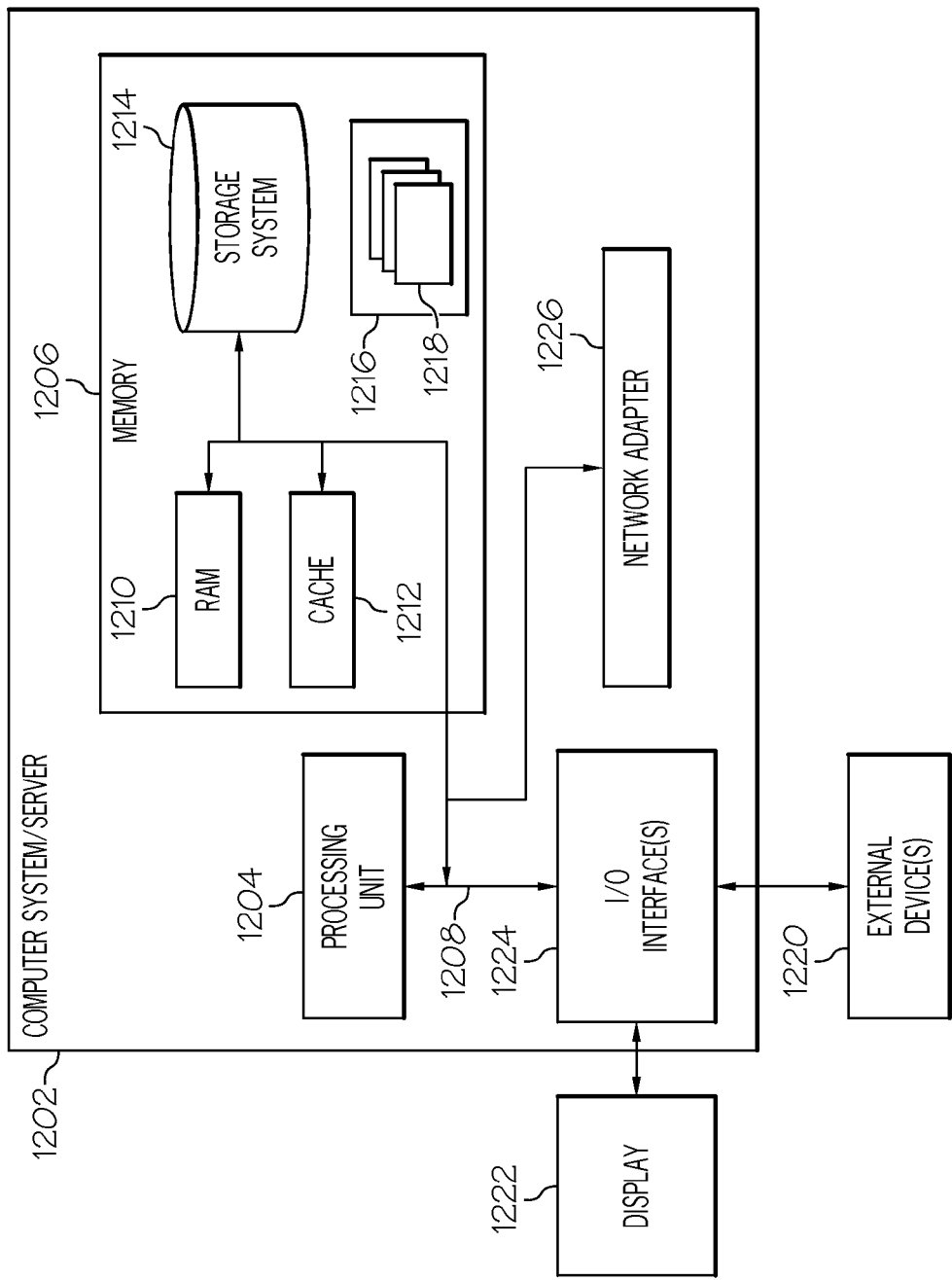

CONNECTION MANAGEMENT AND OPTIMIZATION FOR SERVICES DELIVERED OVER NETWORKS

STATEMENT REGARDING FEDERALLY SPONSORED RESEARCH OR DEVELOPMENT

This invention was made with Government support under Contract No. W911QX-10-C-0094 awarded by Defense Advanced Research Projects Agency (DARPA). The Government has certain rights in this invention.

CROSS-REFERENCE TO RELATED APPLICATION

This application is related to application "Content Delivery Mechanisms For Multicast Communication", Ser. No. 13/421,418, which was filed on the same day as the present application and is commonly assigned herewith to International Business Machines Corporation. This related application is herein incorporated by reference.

BACKGROUND

Embodiments of the present invention generally relate to networking, and more particularly relate to optimizing delivery of content in a network.

Devices and links in a network have specific capacity constraints. For example, a link can carry a certain limited amount of information per unit of time. The limit is often dictated by physical properties of the link, and also by the link control elements (hardware and software) of the network. When a link is utilized to capacity, it cannot accept any requests to deliver more information. This situation occurs, for example, when a link is carrying the traffic of a number of users and no more resources are available for new user service requests. In this situation, the link control elements generally need to either: (1) drop current users to accommodate new requesters, (2) reduce the amount of information being carried for each user in order to free up capacity to accommodate new requesters, or (3) deny service to new requestors. These options are often not desirable because they may result in unsatisfactory quality of experience to users.

BRIEF SUMMARY

In one embodiment, a method is provided for optimizing content delivery in a network. There is a network node communicatively coupled between multiple end user devices and at least one content service provider. According to the method, a request for a media streaming service available from the at least one content service provider is intercepted from a first requestor device. A determination is made as to whether the media streaming service is registered for delivery optimization based on at least one service rule specific to the media streaming service. In response to the media streaming service being registered, another determination is made as to whether a second requestor device is currently receiving the media streaming service from the content service provider. In response to the media streaming service being currently received, delivery optimization of the media streaming service is performed by replicating the media streaming service for delivery to the first requestor device. The replicated media streaming service is sent to the first requestor device.

In another embodiment, an information processing system is provided for optimizing content delivery in a network. The information processing system comprises a memory and a processor that is communicatively coupled to the memory. A connection manager is communicatively coupled to the memory and the processor. The communication manager is configured to perform a method comprising intercepting a request from a first requestor device for a media streaming service available from the at least one content service provider. A determination is made as to whether the media streaming service is registered for delivery optimization based on at least one service rule specific to the media streaming service. In response to the media streaming service being registered, another determination is made as to whether a second requestor device is currently receiving the media streaming service from the content service provider. In response to the media streaming service being currently received, delivery optimization of the media streaming service is performed by replicating the media streaming service for delivery to the first requestor device. The replicated media streaming service is sent to the first requestor device.

In yet another embodiment, a computer program product is provided. The computer program product tangibly embodies computer readable non-transitory instructions. When the computer readable non-transitory instructions are implemented they cause a computer to carry out the steps of a method for optimizing content delivery in a network. The method comprises intercepting a request from a first requestor device for a media streaming service available from the at least one content service provider. A determination is made as to whether the media streaming service is registered for delivery optimization based on at least one service rule specific to the media streaming service. In response to the media streaming service being registered, another determination is made as to whether a second requestor device is currently receiving the media streaming service from the content service provider. In response to the media streaming service being currently received, delivery optimization of the media streaming service is performed by replicating the media streaming service for delivery to the first requestor device. The replicated media streaming service is sent to the first requestor device.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 illustrates an exemplary Hyper Text Transmission Protocol request message according to one embodiment of the present invention;

FIG. 4 illustrates an exemplary Hyper Text Transmission Protocol response message according to one embodiment of the present invention;

FIG. 5 shows content service provider information maintained by the connection manager of FIG. 2 according to one embodiment of the present invention;

FIG. 11 is an operational flow diagram illustrating optimized delivery of a media streaming service according to another embodiment of the present invention; and FIG. 12 illustrates an information processing system for use in embodiments of the present invention.

DETAILED DESCRIPTION

As described below, embodiments of the present invention optimize delivery of media streaming services and their content streams in a programmable manner, via rules or policies defined for each service. One exemplary embodiment provides for the separation of the basic building-blocks for abstracting of the functions required to identify opportunities for commonality in the streams, for replication of the streams when needed, and for delivery of replicated streams to end-clients in a transparent, secure manner using unicast methods. Further, the exemplary embodiment supports the use of multiple rule sets (one for each of the services supported) that are invoked, interpreted, and executed in a concurrent manner in a single instance of the apparatus. These rule sets can be enabled or disabled at run-time, under the control of an external network element/entity, a human operator, or both. This enablement and disablement turns on and off one or more functions in the rule sets. The exemplary embodiment also allows for multi-tenancy, in the form of simultaneous and concurrent delivery of independent content streams or services, on behalf of independent sets of service providers and end-users, from a single instance of a connection manager.

Figure 1:
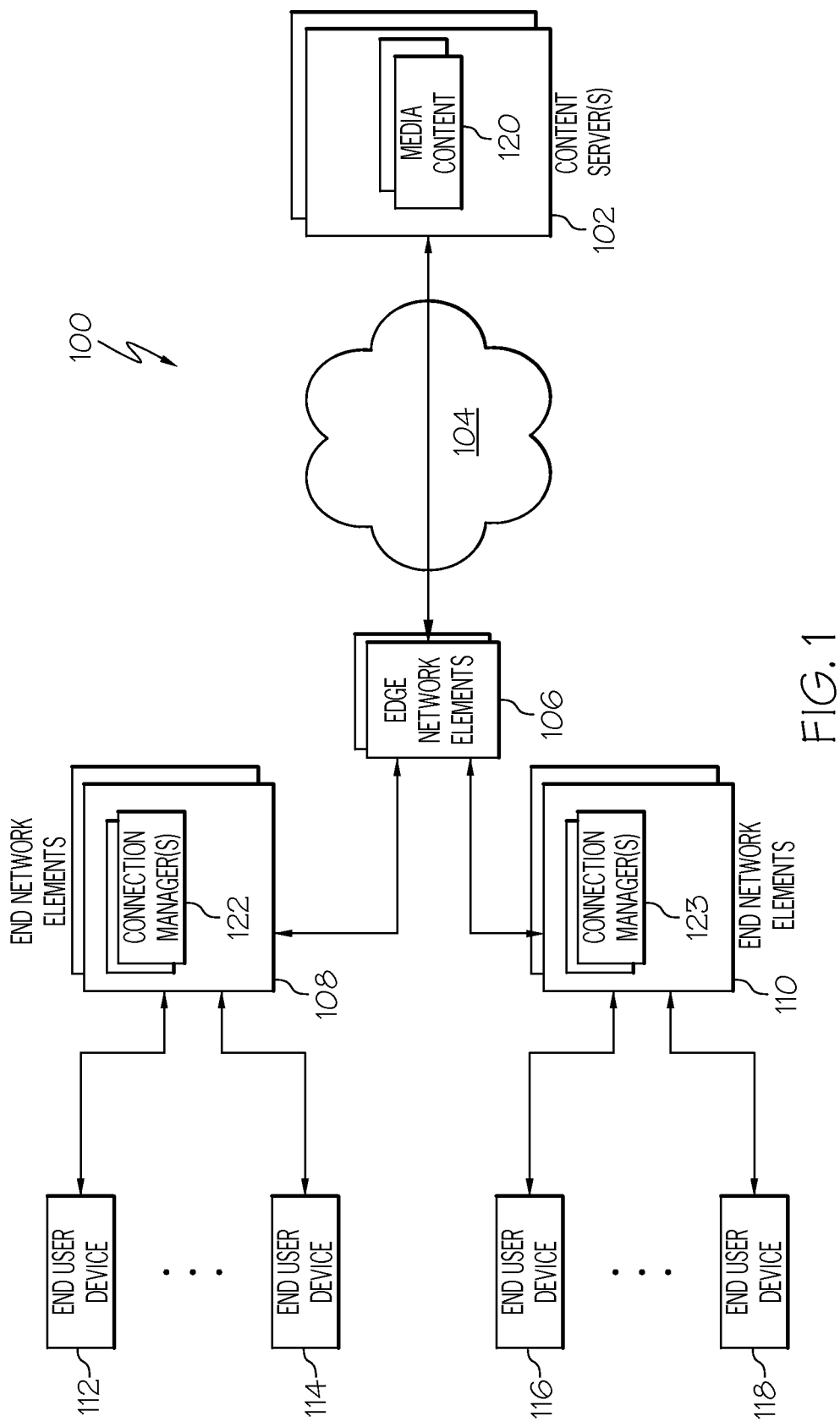
FIG. 1 is a block diagram illustrating an operating environment according to one embodiment of the present invention.

FIG. 1 shows an operating environment 100 according to one embodiment of the present invention. As shown, one or more content servers 102 are communicatively coupled to a delivery network 104 such as, but not limited to, the Internet or any other telecommunications network comprising wired and/or wireless technologies. The delivery network 104 comprises various network elements/nodes such as routers and switches. One or more edge network nodes/elements 106 reside at the edge of the delivery network 104. The edge network nodes 106 transfer traffic from the delivery network 104 to one or more edge networks, and vice versa. End network nodes 108 and 110 (such as routers and switches) are communicatively coupled to the edge network nodes 106. The end network nodes 108 and 110 are within end networks that interface directly with end user devices 112, 114, 116, and 118. Examples of end user devices are laptop computers, notebook computers, personal computers, tablet computing devices, wireless communication devices, Personal Digital Assistants, gaming units, and the like.

In this exemplary embodiment, the content server 102 comprises media content such as audio, video, and text that can be provided to end user devices. Media content can either be live or pre-stored. Live media content is generated in real-time by a content service provider and captured by the content server 102. The content server 102 provides the live media content to requesting end user devices. Examples of live media content are video and audio of sporting events, news events, and so on that are provided by various content service providers. Pre-stored media content is content that is not generated in real-time but instead has been previously generated/created and can be accessed at any point in time by end user devices. Examples of pre-stored media content are movie files, audio files, and so on. In this embodiment, the content server hosts the pre-stored media content and is considered the content service provider because the end user devices 112-118 request the content directly from the content server 102. However, in another embodiment, other servers host the pre-stored media content and are considered the content service providers. The content service providers send their content to the end user devices 112-118 through the content server 102.

The media content 120 is provided to the end user devices 112-118 via one or more media streaming services ("service" or "streaming service"), which provide one or more content streams to the end user devices 112-118. Streaming refers to the process of continuously transmitting data from a source device (e.g., the content server) to a target device (e.g., an end user device), with the target device processing the data as it is received. For example, an end user device 112 is able to view portions of a video file as they are received from the content server 102 without having to first store the entire video file. Examples of streaming services are a real-time streaming service for providing a content stream comprising live audio/video to the end user devices, an audio streaming service for providing a content stream comprising pre-stored audio media content to the end user devices, and a movie streaming service for providing a content stream comprising pre-stored movie content to the end user devices.

An end user device 112 sends a request to the content server 102 for specific media content 120, a specific service, or both. For example, an end user device 112 can send a request to the content server 102 for a specific movie to be streamed to the device via a movie streaming service. As another example, the end user device 112 can send a request for an audio streaming service, which streams various audio content items within the media content 120 to the device. While examples are given with respect to media streaming services requested by end user devices, embodiments of the present invention also apply to other types of data content requested by end user devices.

One mechanism that can be used to stream the media content 120 to the end user devices 112-118 is a unicast transmission mechanism. Unicast transmission mechanisms send a separate instance of the media content 120 to each requesting end user device 112-118 over a separate logical connection/link between the content server 102 and each end user device. For example, a connection (either logical or physical) is made with the content server 102 for each end user device 112-118 requesting a service for providing the media content 120. It should be noted that a link can be shared except for the last hop between an end user device 112 and end node 108. The content server 102 continuously transmits a content flow/stream to each end user device 112-118 over each connection. Standard network protocols such as TCP/IP permit unicast transmission to be reliable, error-correcting, secure, authenticated, and private.

Although unicast transmission mechanisms have many advantages, they require a large amount of resources for transmitting data to multiple end user devices over multiple links. The total amount of transmission capacity required to support a unicast delivery mechanism for each content stream needs to scale linearly with the number of end user devices consuming the content. If many end user devices are requesting the same content and bandwidth resources are constrained, service requests may go unsatisfied or the user experience at the end user devices may become unsatisfactory.

Therefore, in this exemplary embodiment, one or more connection managers 122, 123 are provided in one or more networks (e.g., the end networks, the edge networks, the delivery network 104, etc.) for optimizing the delivery of a content stream to multiple end user devices 112-118. The connection manager 122 transparently intercepts requests for streaming services submitted by requestor devices (requestors or clients), such as the end user devices 112-118 and/or one or more other connection managers 123, to the content server 102. The connection manager 122 analyzes the requests from different end user devices to identify redundant requests (i.e., requests for the same streaming service from the same content service provider). The connection manager 122 then utilizes one or more rule sets associated with the content service providers to optimize the delivery of the content provided by a service to the multiple devices.

When the connection manager 122 detects that multiple requestor devices are requesting the same content service from a given content service provider, the connection manager 122 establishes a single connection with the content server 102 to receive the requested service (and its media content) from the server 102. The connection manager 122 then replicates the content stream provided by the service and transmits the replicated content stream to each of the requestor devices over separate links. This allows the content server to only establish a single link with connection manager 122 while being able to transmit the content stream to multiple end user devices. Stated differently, a unicast link is established between the content server 102 and a first requesting device through the connection manager 122. The connection manager then establishes links between itself and any secondary requesting device.

The connection managers 122 are situated within operating environment 100 such that content service requests from multiple requestor devices are transparently transmitted through the connection managers 122, 123 to the content server 102. In this embodiment, one or more connection managers 122, 123 are situated within an end network node/element 108, 110, as shown in FIG. 1. However, in another embodiment, the connection manager 122 is situated within an edge network node(s) 106 in addition to or instead of the end network nodes 108, 110. In this other embodiment, the connection manager disposed within the edge network node 106 intercepts requests from the connection managers 122, 123 within the end network nodes 108, 110 or from the end user devices 112-118. Connection managers 122, 123 can also be situated within any other network element/node at any other location within the operating environment 100 that is between the end user devices 112-118 and the content server 102.

In addition, the connection manager 122 can be placed strategically at any point in a network where multiple branches occur. This provides the ability to serve multiple network branches while optimizing for redundancy. In this embodiment, each instance of the connection manager 122 cooperates with other instances in a transparent manner to optimize for redundancy in content streams. Each instance of the connection manager 122 operates independently, optimizing content delivery either on behalf of end-user devices, or downstream connection manager instances. The connection manager 122 is configured so that independent threads of execution are created and launched on a per-connection basis. The state of each thread is manipulated independently, and the common shared objects within the service state information 212 are guarded for safe sharing across the entire stack of functional layers 202, 204, 206, and 208 of the connection manager 122. The connection manager 122 can also be configured to operate as a single thread of execution which can handle multiple independent connections using standard scheduling techniques, and sharing common shared objects within the service state information 212 without requiring mechanisms for guarding the state.

Figure 2:
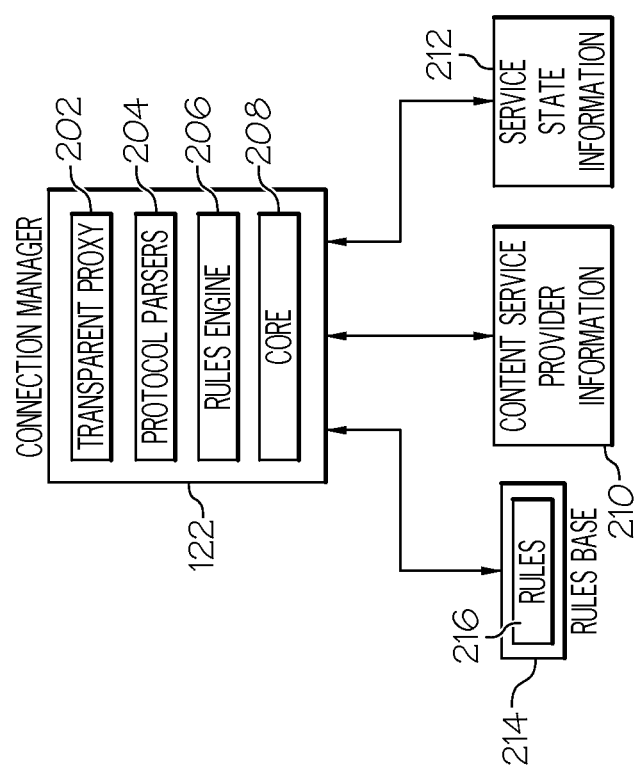
FIG. 2 is a block diagram illustrating an edge network node/element that includes a connection manager according to one embodiment of the present invention.

FIG. 2 shows a more detailed view of the connection manager 122 according to one embodiment of the present invention. In this embodiment, the connection manager 122 includes a transparent proxy module 202, one or more protocol parsers 204, a rules engine 206, and a connection manager core module 208. FIG. 2 also shows that the connection manager 122 includes and/or is communicatively coupled to content service provider information 210, service state information 212, and a rules base 214, which comprises one or more rules 216. The content service provider information 210 comprises information associated with each content service provider that has registered with the connection manager 122 for optimization. The service state information 212 comprises information associated with each individual service being optimized by the connection manager 122.

The rules base 214 comprises rules 216 that are encoded as rule sets. In this embodiment, there are ground rule sets and service rule sets. Ground rule sets are default rules that are not specific to any streaming service or content service provider. The ground rules are applied to a communication when it is first received and/or when a determination is made that optimization are not to be performed. Service rule sets comprise rules that are specific to a given streaming service and/or content service provider and are used by the connection manager 122 to optimize the delivery of streaming services and their content streams to multiple end user devices. A service rule set for a given service (or content service provider) comprises service rules for requests received from requestor devices and service rules for responses received from content service providers.

Each rule set 216 is dedicated to optimizing the delivery of streaming services and their content streams comprising live or pre-stored media content 120. Each rule set 216 is an entity independent of the rest of the connection manager 122, and can be interpreted, compiled, built-in, or plugged in, at runtime, at compile-time, or both. The connection manager 122 provides complete flexibility to accommodate all forms and types of specification of rules for optimization of various services. Each rule set 216 comprises entry point methods that are invoked when the protocol parsers 204 detect matching patterns or events in the flow of requests and responses. For example, when an HTTP (Hyper Text Transmission Protocol) request is made by a requestor device, a rule that checks for the content of the "Host:" field is executed. This rule checks for occurrence of conditions such as existence of a certain hostname (e.g., Srvc_Prvdr_1.com).

When a match occurs, the core module 208 takes actions which create, manipulate, alter, or delete the service state information 212 based on the rule set(s) 216. The core module 208 is responsible for maintaining and managing the state of each client connection, roles of the clients and servers, the content buffers held in the system on behalf of the clients, and the state updates to each of these elements. While these actions performed by core module 208 result from the execution of the rules, the elements of the core module 208 are themselves independent of the rules that optimize a specific service.

The rule sets 216 are external to the connection manager 122, and are crafted outside of the connection manager 122. Therefore, the rule sets 216 describe the logic by which the connection manager 122 can take advantage of redundancy in requested services and their content streams, in a service-independent fashion. The rule sets 216 can be encoded in various ways, for example, in a high-level programming language (e.g., C, C++, Java) or in an interpreted language (e.g., JavaScript, Python). The rules engine 206 provides a unified interface for the inclusion of rule sets 126 specified by a variety of methods, and allows for service-independent manipulation of the service state information 212.

In addition, the rule sets 216 can be supplied using an external management entity, such as a network manager. In this embodiment, an instance of the connection manager 122 is installed in the delivery network 104 without any rule-sets in the rule base 214. Then, at runtime, one or more sets of rules are downloaded in the instance, based on the business or other needs of the network operator, and/or of the operator's clients/customers. Further, in a similar manner, one or more rule sets already downloaded and installed in an instance of the connection manager 122 are modifiable, either partially or in entirety. This embodiment enables the operator to enable or disable the optimization of a streaming service, and optimize the bandwidth on-demand.

The rule sets can be designed in a hierarchical fashion. For example, a streaming service can be composed of high-level rules addressing the needs of the application layer of the service protocol. When that application layer protocol makes use of a standard lower level protocol, the rules of the lower level protocol can be specified as a low-level rule-set, to be invoked by the high-level rule-set. Therefore, hierarchical service composition is possible in order to enable optimization of streaming for such complex services. An example of this feature is a live Internet television streaming service using the low-level RTMP (real-time multimedia protocol) for delivery of live video streams.

The transparent proxy module 202 transparently intercepts communications (i.e., messages such as requests and responses) between requestor devices and the content server 102. The communications can be intercepted at Layer 2 (link level), Layer 3 (packet level), or layer 4 (transport level) and above of the Open System Interconnection (OSI) network model. In this exemplary embodiment, the proxy module 202 monitors for Internet protocol connection requests from requestor devices to the content server 102. FIGS. 3 and 4 show exemplary communications that are intercepted by the proxy module in one embodiment. In particular, FIG. 3 shows an HTTP request 300 received from an end user device 112, and FIG. 4 shows a corresponding HTTP response message 400 received from the content server 102. The request 300 and response 400 shown in FIGS. 3 and 4 only include portions of a complete request and response ease of understanding. It should be noted that embodiments of the present invention are not limited to the HTTP protocol and are applicable to other link-layer, network-layer, or application-layer protocols as well.

The HTTP request message shown in FIG. 3 includes a request line 302 and a headers section 304. Other components such as a blank line and the message body are not shown in FIG. 3. The request line 302 comprises a method token 306 ("GET"), a request Uniform Resource Identifier 308 ("//srvc_prvdr_1.com/Service1/Flow1"), and an identifier 310 ("HTTP/1.1") identifying the version of HTTP being used. The method token 306 identifies the method to be performed on the resource identified by the request Uniform Resource Identifier (URI) 308. The request-URI 308 identifies the resource upon which the request is applied.

The header section 304 includes additional information about the request 300 and the end user device 112 itself. The exemplary request 300 includes a "Host:" field 312 in the header section 304 that identifies the domain name of the server that provides the requested resource (e.g., service). Stated differently, the "Host:" field 312 identifies the content service provider ("srvc_prvdr_1.com") associated with the request 300. Another field under the header section 304 is the "Cookie:" field 314, which comprises state information from a cookie associated with the end user device 112 and the content service provider. The state information includes a session identifier ("SessionID"), authentication information, user preferences, and the like.

An end user device 112 can submit different types of requests depending on whether a request streaming service is a "pull" or "push" service. A "pull" service requires an end user device to submit a content request whenever the device requires content. Therefore, a device sends a content request and non-content requests for a "pull" service. Non-content requests identify the requested service, the requested content flow/stream, and the like. A "push" service sends content to an end user device without the need for the device to continually request the content. Therefore, with respect to a "push" service, the device only needs to send a request for establishing a connection with the service provider.

FIG. 4 shows a corresponding HTTP response message 400 for the HTTP request message 300 of FIG. 3. The HTTP response message 400 shown in FIG. 4 includes a response status line 402 and a header section 404. Other components such as a blank line and the message body are not shown in FIG. 4. The response status line 402 includes the protocol version "HTTP/1.1" followed by a numeric status code ("200") and its associated textual phrase ("OK"). The header section 404 of the response allows the server hosting the requested resource to pass additional information about the response 400 that cannot be placed in the response status line. These header fields in the header section give information about the server and about further access to the resource identified by the request-URI. A more detailed discussion on HTTP request and response messages is given in W3C Network Working Group's Request For Comments 2616 "Hypertext Transfer Protocol—HTTP/1.1", June 1999, which is herein incorporated by reference in its entirety.

Referring back to FIG. 2, the proxy module 202 is configured to identify the type of communication protocol being used in each intercepted message. For example, the proxy module 202 can determine whether a message is using HTTP, HTTPS (HTTP Secure protocol), RTMP (Real-Time Multimedia Protocol), etc. The proxy module 202 identifies the protocol type based on the communication port over which the message was transmitted, a template for each protocol that is compared to the message, or based on information within the message. Once the protocol associated with the message is identified, the proxy module 202 is able to invoke the appropriate protocol parser 204, via a programmatic interface, for interpreting the message.

In this embodiment, the connection manager 122 includes multiple parsers 204, one for each communication protocol (e.g. HTTP, HTTPS, RTMP, etc.) of interest. Each parser 204 is configured to process request messages and response messages separately. Also, each parser 204 is configured to process the state of each connection separately such that maximum benefit of task-level concurrency can be obtained. A parser 204 invokes the rules engine 206, via a programmatic interface, for processing the information identified within a response/request message by the parser 204. The programmatic interface provides execution points upon each entry point for request and response messages for each protocol parsed.

During each invocation of the rules engine 206 one or more rules are executed based upon the specific behavioral actions enumerated in a rule set 216 and upon matching of conditions. The execution of rules is carried out on behalf of an end user device and can be independent of the other end user devices, or may have a dependency on the actions and consequences of the other end user devices. The rules engine 206 performs the task of enforcing and honoring all such dependencies.

The rules engine 206 utilizes the parser 204 to obtain information from the received message. The information obtained by the parser 204 is identified in the ground rules and/or the service rules of the rules base 214. As discussed above, the ground rules are not specific to any content service provider, but are default rules that are applied to a message when it is first received and/or when a determination is made that optimization is not to be performed. When a message such as a request or response is first received, the rules engine 206 applies a ground rule that indicates which portions of the message to parse for identifying the content service provider and/or service associated therewith. For example, a ground rule can indicate that information from the "Host:" field within an HTTP request is to be obtained by the parser 204. Using the request message 300 shown in FIG. 3, the parser 204 identifies the "Host:" field 312 within the request 300 and obtains the value of the field, which is "Srvc_Prvdr_1.com". The connection manager 122 uses this information to determine whether or not optimization is to be performed for delivering the associated content stream and its content.

In this embodiment, the rules engine 206 determines if optimization is to be performed for the requested service by determining if the information parsed from the request message 300 satisfies any conditions of any service rules within the rules base 214. For example, a service rule can include a condition such as "(requestheader[host].contains ("Srvc_Prvdr_1.com")". This condition indicates that the "Host:" field 312 within the header of the request message 300 needs to include the value of "Srvc_Prvdr_1.com" in order for one or more optimizations provided by the connection manager 122 to be initiated. Stated differently, the "Host:" field 312 needs to identify a given content service provider, such as "Srvc_Prvdr_1.com". Therefore, the rules engine 206 compares the "Host:" field value of "Srvc_Prvdr_1.com" obtained from the request message 300 shown in FIG. 3 to the value required by the above condition. In this example, the rules engine 206 determines that the "Host:" field value of "Srvc_Prvdr_1.com" obtained from the request message 300 satisfies the above condition. Therefore, the rules engine 206 determines that the service rule(s) comprising the satisfied condition is associated with the content service provider Srvc_Prvdr_1.com and is to be used for optimizing the delivery of the content stream of the requested service.

A similar process is applied to response messages 400 intercepted by the proxy module 202. For example, when a response message 400 from the content server 102 is received the proxy module 202 identifies the protocol associated with the response message 400. A parser 204 is invoked to obtain information from the message 400 as indicated by one or more ground rules and/or service rules. Based on these rules and the information within the message 400, the rules engine 206 determines the content service provider associated with the response 400, the service (and/or content) being provided in the response 400, and the like.

The service rules can also include conditions associated with the requested service. For example, a content service provider may provide more than one media service such as a video streaming service and an audio streaming service. Each of these services can provide multiple unique content streams such as different channels of live-video or different audio stations. In this embodiment, the content service provider may only want to have optimization performed for its video streaming service (or for a specific content stream). Therefore, the service rule associated with this content service provider can indicate that in addition to the "Host:" field 312 of the request 300 comprising a given value, the request-URI in the request line 302 of the message 300 also needs to comprise a given value. For example, the service rule can include a condition such as "(request.uri.contains("Service1/ ")", where "request-URI" identifies the service provided by the service provider for which optimization is to be performed.

The rules engine 206 performs a comparison process to determine if the information parsed from the request-URI in the request message 300 satisfies the above condition. Once the rules engine 206 determines that all conditions of the service rule have been satisfied, optimization can be initiated by the core module 208. If one or more conditions of an associated service rule are not satisfied by a request/response message, ground rules are checked to determine what action to take. In this embodiment, the request/response is passed on to the content server 102 or requestor device without any optimization operations being performed.

In another embodiment, the rules engine 206 is not required to search through all of the conditions within service rules to determine whether or not a given service rule applies to the content service provider associated with an intercepted message. For example, when a message is received by the proxy module 202, a ground rule can instruct the rules engine 206 to analyze the content service provider information 210 to determine if the content service provider associated with the received message is registered with the connection manager 122 for optimization. FIG. 5 shows one example of content service provider information 210. In particular, FIG. 5 shows a table 500 comprising a set of information for multiple content service providers that are registered with the connection manager 122 for optimization. Embodiments of the present invention are not limited to the information or columns shown in FIG. 5 (e.g., one or more columns can be added or deleted in the table). Also, the embodiments are not limited to the use of a table format for this information, and any other standard formats to arrange this information can be used.

In the example shown in FIG. 5 each row of the table is associated with a single content service provider, but other organization formats are applicable as well. As shown, the table has a first column 502 entitled "Service Provider ID". This column 502 comprises entries 504 including a unique identifier (ID) associated with each content service provider registered with the connection manager 122. This ID allows the connection manager 122 to distinguish the content service providers from each other and also to locate information associated therewith.

A second column 506 entitled "Service Provider Name" includes entries 508 identifying the name of a given content service provider. A third column 510 entitled "Service Provider URL" comprises entries 512 identifying a uniform resource location (URL) associated with a given content service provider. A fourth column 514 entitled "Rule Set ID" includes entries 516 with a unique identifier of each service rule set 216 associated with the given content service provider. A fifth column 518 entitled "Optimization State" includes entries 520 indicating whether or not the connection manager is to perform optimization for a given content service provider. The content service providers can dynamically enable or disable the optimization provided by the connection manager. If a content service provider is not configured for dynamically enabling or disabling the optimization, then an entry 522 under this column 518 indicates so.

As discussed above, the rules engine 206 determines if the content service provider associated with the received message is registered with the connection manager 122 by analyzing the content service provider information 500. For example, the rules engine 206 can compare the content service provider identifier "Srvc_Prvdr_1.com" parsed from the "Host:" field 312 of the request message 300 shown in FIG. 3 against the content service information shown in FIG. 5. If the content service provider identifier "Srvc_Prvdr_1.com" matches an entry within the content service provider identifier 500, then the rules engine determines that the content service provider "Srvc_Prvdr_1.com" is registered with the connection manager 122 for optimization. In this embodiment, the rules engine 206 further analyzes the "Optimization Status" column 518 to determine whether or not optimization is enabled or disabled for the given content service provider. In the current example, optimization for Srvc_Prvdr_1.com is enabled. The connection manager 122 also determines whether optimization is to be globally applied to all services provided by a service provider or to specific services (and/or specific content streams of a service) provided thereby. For example, a column can be used to list the specific service or content, such as Service1, for which optimization is to be applied. This column can also include entries that indicate that optimization is to be applied to all content/services provided by the service provider.

If the rules engine 206 determines that content delivery optimization is not to be performed for the media streaming service associated with the received message, the message is passed onto the content server 102 or requestor device without any optimization operations being performed. The rules engine 206 determines that content delivery optimization is not to be performed by failing to identify an entry within the content service provider information for the service provider associated with the received message, by determining that optimization is disabled for the content service provider or by determining that optimization is not designated for the request service.

When the rules engine 206 determines that content delivery optimization is to be performed for a given service based on the content service provider information 210, the rules engines 206 identifies a set of service rules within the rules base 214 that are associated with the requested service. In this embodiment, the rules engine 206 analyzes the content service provider information 500 shown in FIG. 5 and identifies the rules set ID associated with the content service provider or requested service of the provider for the given message. The rules engine 206 uses this ID to obtain the corresponding service rule set from the rules base 214. In this embodiment, a single service rule can be associated with more than one service provided by a content service provider. A similar process is performed to identify rules associated with response messages 400 received from the content server 102.

The service rules interact with by the core module 208 to initiate and perform optimization, as well as maintain service state information 212 associated with the services that are being optimized. If the one or more conditions of an associated service rule are not satisfied by a request/response message, ground rules are checked to determine what action to take. In this embodiment, the request/response is passed on to the content server 102 or requestor device without any optimization operations being performed.

Figure 6:
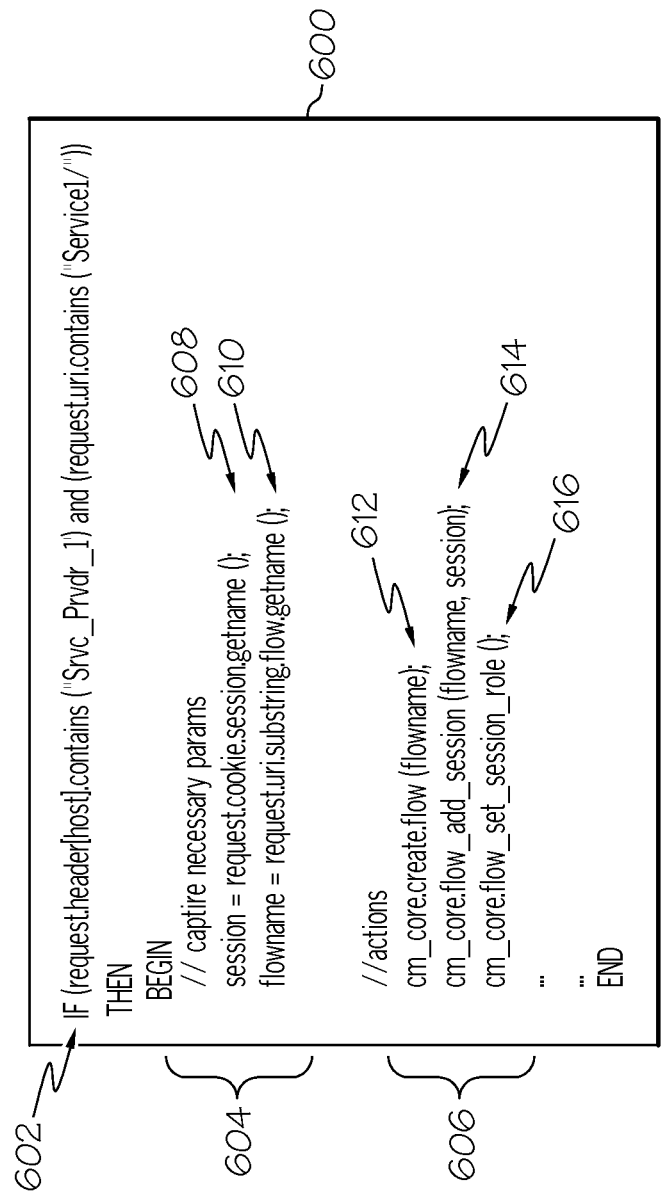
FIG. 6 shows a service rule utilized by the connection manager of FIG. 2 for optimizing delivery of a media streaming service according to one embodiment of the present invention.

FIG. 6 shows an exemplary request message service rule 600 for Service1 provided by content service provider Srvc_Prvdr_1. A similar service rule is included within the service rule set for responses messages. As discussed above, service rules are used by the core module 208 for maintaining service state information 212 for a given service being provided to end user devices, and also for optimizing delivery of content streams of that service. The service rule 600 includes one or more conditions 602 that are to be satisfied prior to applying the rule. In an embodiment in which the content service provider information 210 is utilized, any conditions not included within the content service provider information 210 can be included within the service rule 600. Also, information such as the optimization status 518 can be included within the service rule 600 as well.

The service rule 600 also includes a parameter section 604 and an action section 606. The parameter section 604 identifies which parameters the core module 208 is to obtain from the received message 300. In this example of FIG. 6, the service rule 600 indicates that the core module 208 is to obtain a session parameter 606 and a flow name parameter 608 from the request message 300. The service rule 600 also indicates how and where the core module 208 is to obtain these parameters 608 and 610. For example, the service rule 600 indicates that the session parameter 608 is to be obtained from the "Cookie:" field 314 in the header section 304 of the request 300 using the following method: cookie.substring.session.getname( ). In this example, the core module 208 obtains "SessionID1" from the "Cookie:" field 314 shown in FIG. 3. The service rule 600 also indicates that the flow name parameter 610 is to be obtained from the URI 308 in the request line 302 of the message 300 using the following method: request.uri.substring.flow.getname( ). In this example, the core module 208 obtains "Flow1" from the URI 308 shown in FIG. 3. A flow is a unique content stream provided by a service. The parameter section 604 can also identify other parameters to be obtained by the core module 208.

The action section 606 identifies various actions that the core module 208 invokes to perform with respect to the service state information 212, which is utilized by the core module 208 for optimizing the delivery of content streams of a service to multiple end user devices. For example, FIG. 6 shows that the core module 208 is to create a flow object for the state information 212 using the method cm_core.create.flow (flowname) 612, where "flowname" is the flow name parameter 610 obtained by the core module 208 from the message 300. The action section 606 also indicates that the core module 208 is to add a session to the state information 212 using the method cm_core.flow_add_session (flowname, session) 614, where "session" is the session parameter 608 obtained by the core module 208 from the message 300. The action section 606 further indicates that the core module 208 is to assign a role (e.g., primary or secondary) to the requestor device associated with the request using the method cm_core.flow_set_session_role ( ) 616. Other actions can also be included within the service rule 600.

Figure 7:
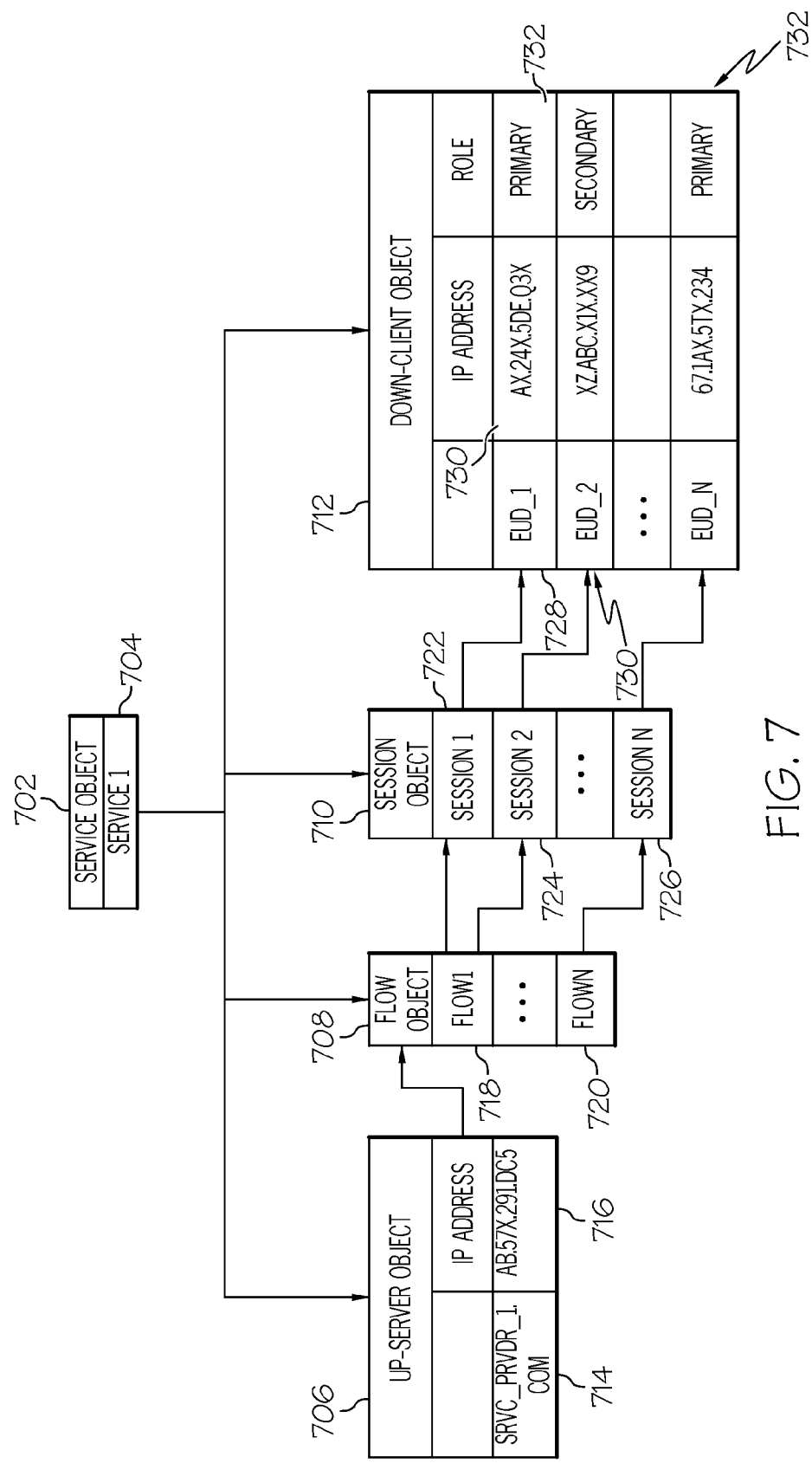
FIG. 7 shows service state information maintained by the connection manager of FIG. 2 according to one embodiment of the present invention.

The core module 208 utilizes the parameters and actions to create, update, and maintain service state information 212 that is utilized by the core module 208 to perform content stream delivery optimization. Service state information 212 includes a plurality of objects or data structures such as queues, tables, lists, and the like, which represent an individual service being optimized based on redundancy. FIG. 7 shows one example of service state information 700 created by the core module 208 based on the service rule 600 of FIG. 6. The service state information 700 includes a service object 702 that is created by the core module 208 when a first request for a service is received and optimization is to be performed for that service. The service object (including any related objects) for the service is then updated as additional requests and responses associated with the service are received.

For example, when the proxy module 202 receives a first request (or request/response pair) from a requestor device for a given service registered by optimization, the core module 208 creates the service object 702, as shown in FIG. 7. In this example, the requested service is "Service1" such as a live-video service, an audio streaming service, or a movie streaming service. The service object 702 represents the individual service (e.g., Service1) being optimized for redundancy. The service object 702 is identified by a unique ID string, such as a unique identifier 704 associated with the service. In the example shown in FIG. 7, this unique identifier is "Service1", which can be obtained from the request 300 or the associated service rule 600.

A service is associated with multiple sessions, one for each requestor device (i.e., down-stream client) receiving/requesting the service. A service is also associated with one or more flows, which are unique content streams provided by the service that are consumable by one or more of the end user devices. A service is also associated with a content service provider (i.e., up-stream server) that provides the service in a content stream. Therefore, the connection core module 208 creates an object for each of these entities using the actions identified in the service rule 600. For example, FIG. 7 shows that the service object 702 comprises an up-stream server object 706, a flow object 708, a session object 710, and a down-stream client (requestor) object 712. These objects can be included within the service object itself or can be linked to the service object.

The up-stream server object 706 represents the state of the content service provider (server) that is providing the service represented by the service object 702. The information in the up-stream server object 706 uniquely identifies the content service provider. For example, FIG. 7 shows that the up-stream server object 706 comprises an entry 714 identifying the content service provider Srvc_Prvdr_1.com and another entry 716 comprising the internet protocol (IP) address of Srvc_Prvdr_1.com. The up-stream server object 706 can also include the port number associated with connections to/from the service provider. In this embodiment, the up-stream server object 706 is created by the core module when the proxy module receives a response from the content service provider (or when a request is received from a requestor device).

The flow object 708 represents a unique content stream of the service that is being consumed by one or more clients. The core module 208 creates (or updates) the flow object 708 using a service rule 600 when a session takes an action(s) to avail a content stream. For example, the service rule 600 comprises a method 612 to be performed by the core module for creating a flow object, as discussed above. Based on the request shown in FIG. 3 and the rule 600 shown in FIG. 6, the core module 208 creates a flow object 708 with the flow name "Flow1" obtained from the request 300, which uniquely identifies the flow. A service represented by the service object 702 can provide more than one unique content stream. For example, a live video service can provide multiple channels of live video, where each channel is a unique content stream. The requestor device can specify a given flow of a service in the request message (e.g., "//srvc_prvdr_1.com/Service1/Flow1" or "//srvc_prvdr_1.com/Service1/FlowN"). Therefore, a separate entry (or flow object) is created for each unique content stream of the service being consumed/received by end user devices. A single flow object 708 for each flow can be created, or a global flow object can be created that comprises an entry (or object) for each flow.

The session object 710 represents an information interchange during which a requestor device receives a content stream provided by the requested service. The core module 208 creates (or updates) a session object 710 using a service rule 600 when a requestor device requests a service, for which a session specific to that service is opened. For example, the service rule 600 comprises a method 614 to be performed by the core module 208 for adding a session object for a given flow, as discussed above. Based on the request 300 shown in FIG. 3, the core module 208 creates an entry 722 (or separate session object) with the session ID name "SessionID1" obtained from the request 300 within the flow object 708. The session ID name uniquely identifies the session associated with the requestor requesting the service. Because this session is associated with the flow "Flow1", the core module links (as indicted by the arrow) this session object entry 722 to the flow object entry 718 for Flow1. Any linking mechanism such as a pointer can be used to link these two object entries together. Multiple requestor devices can request the same service, and the core module 208 creates a separate session object entry for each requestor device requesting the service. For example, FIG. 7 shows that additional entries 724 and 726 have been added to the session object 710. A single session object 710 for each session can be created, or a global session object 710 can be created that comprises an entry (or object) for each session.

The down-stream client object 712 represents the state of each requestor device being managed by the connection manager 122 for the service represented by the service object 702. For example, FIG. 7 shows that the down-stream client object 712 comprises an entry 728 identifying END_USER_DEVICE1 (EUD1) and another entry 730 comprising the internet protocol (IP) address of EUD1. The down-stream client object 712 can also include the port number associated with connections to/from the requestor device. The information in the down-stream client object 712 uniquely identifies the requestor device. The down-stream client object 712 also comprises a role entry 732 which indicates the role of the requestor device with respect to the given content stream (flow).

In this embodiment, the first requestor device to request a given service is referred to as the primary client. Each subsequent requestor device requesting the same service is referred to as a secondary client. A single down-stream client object 712 for each requestor device can be created, or a global down-stream client object 712 can be created that comprises an entry (or object) for each requestor device. As the delivery of the content streams progresses, arbitrary events may occur (e.g., the primary client or a secondary client may drop out). Also, either type of client may request change to another content stream, or may request an entirely new service. Any and all of these events are managed via the service rule in an automatic and transparent manner.

At any given instance, multiple service objects can be active, multiple client objects can be active, and multiple down-stream client objects and up-stream server objects can be active all of which participate and cooperate in the optimization of delivery of content streams. The simultaneous, concurrent operation of multiple service objects is referred to as multi-tenancy. This enables the use of common connection manager elements for optimization of disparate services for content delivery.

The core module 208 optimizes a service by replicating the content stream being received as part of a requested service for a primary client and sends the replicated stream to each of the secondary clients. This allows the content server 102 to use a single connection/link over which a given flow (content stream) can be delivered to multiple requestor devices. The core module 208 utilizes the service state information 700 shown in FIG. 7 to identify redundancy in the requests made by requestor devices to perform optimization.

Figure 8:
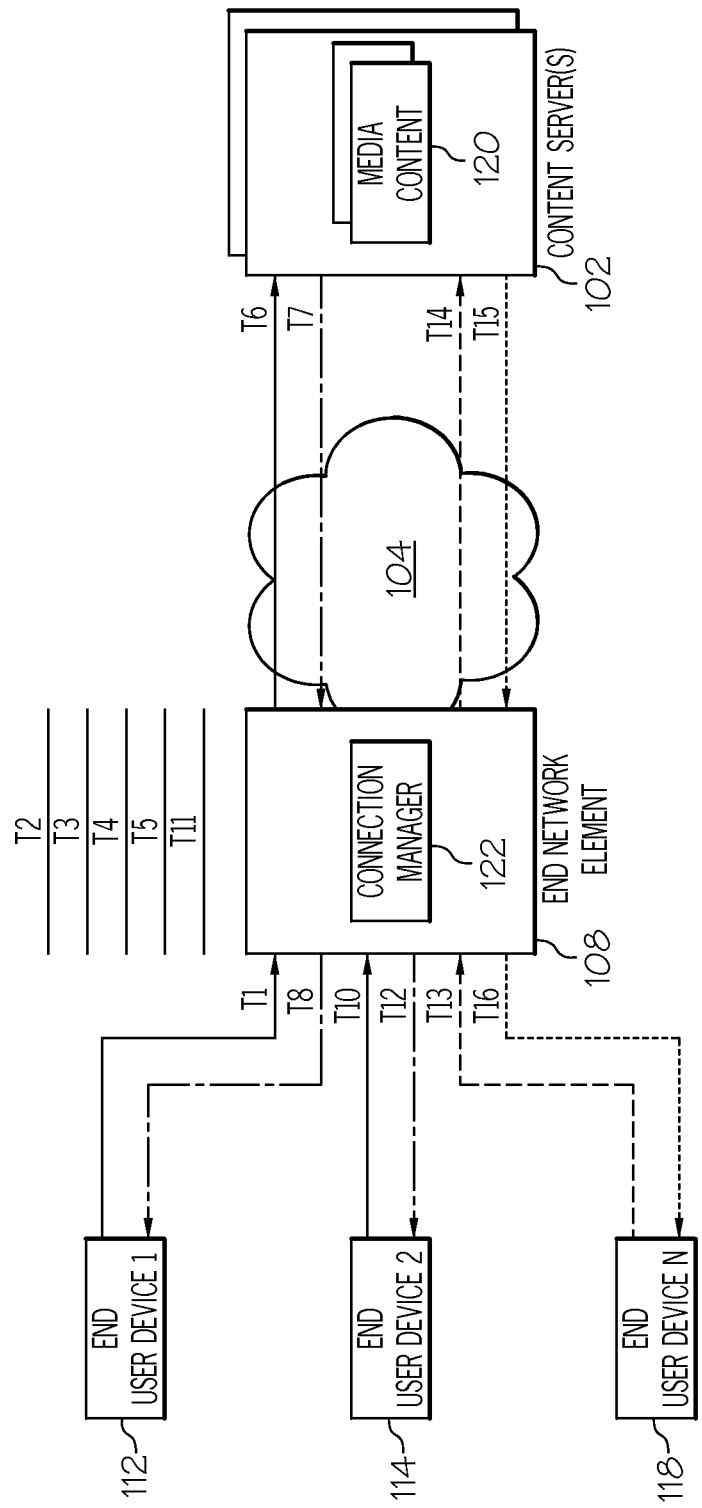
FIG. 8 is a transactional diagram illustrating an overall process performed by the connection manager of FIG. 2 for optimizing delivery of a media streaming service according to one embodiment of the present invention.

FIG. 8 is a transaction diagram showing the optimization of content streams of a request service by the connection manager 122 in accordance with one embodiment of the present invention. The connection manager 122 receives a first request for a service, Service1, from a first requestor device 112 (EUD1), at T1. An example of this request is shown in FIG. 3. The connection manager 122 identifies the communication protocol associated with the request, at T2. In this example, the connection manager 122 determines that the request message is an HTTP request message. The connection manager 122 parses the request message based on one or more ground rules, at T3, to determine if delivery of the requested content is to be optimized. For example, the connection manager 122 parses the request message to identify the requested streaming service and/or content service provider associated therewith. The connection manager 122 then determines if the media streaming service and/or content service provider is registered for optimization.

In this example, the connection manager 122 determines that optimization is to be performed for delivery of the content stream(s) provided by the requested service. The connection manager 122, at T4, analyzes the service state information 700 of FIG. 7 to determine if a service object already exists for the requested service, Service1. The connection manager 122 determines that a service object does not exist for Service1 and proceeds to create a new service object 702, at T5. Because a service object did not previously exist for Service1, the connection manager 122 determines that this is the first request for Service1.

The connection manager 122 also creates the flow object 708, the session object 710, the down-stream client object 712, and optionally the up-stream server object 706 with their corresponding information, as explained above. For example, FIG. 7 shows that EUD1 is the primary client since it is the first device to request Service1. FIG. 7 also shows that EUD1 is associated with a session, Session1, which has been established to receive Flow1 of Service1. The connection manager 122 passes the request message to the content server 102, at T6. The content server 102 processes the request and sends a response back to the EUD1, which is intercepted by the connection manager 122, at T7.

The connection manager 122 performs similar operations on the response message at times T2, T3, T4, and T5. For example, the connection manager 122 analyzes the response message to identify its protocol. Then, based on the identified protocol, the connection manager 122 performs specific parsing operations for that protocol to identify information within the response message required by one or more ground rules and/or service rules. In one embodiment, the connection manager 122 utilizes the information obtained from the response message and the rules to identify the associated service object 702 within the service state information 700 and to create an up-stream server object 706 for the content service provider (if not already created). FIG. 7 shows that an up-stream server object 706 has been created for service provider Srvc_Prvdr_1.com, which identifies the service provider associated with the service being delivered by the content server 102 and also the IP address of the service provider. The up-stream server object 706 (or part of the up-server object) can also be created when a request message is received from the end-user device EUD1.

Based on the information obtained from the response message and the associated rules, the connection manager 122 determines that the response is associated with Flow1 of Service1 and analyzes the service state information 700. The connection manager 122 determines, based on the state information 700, that EUD1 is currently the only client that has requested Flow1 of Service1. The connection manager 122 sends content stream Flow1 from Service1 to EUD1, at T8. The connection manager 122 also captures Flow1 in a content flow queue. The connection manager 122 receives a second request for Service1 from a second user device (EUD2), at T10. The connection manager 122 performs similar operations for this request. In particular, the connection manager 122 determines that EUD2 is requesting to receive Flow1 of Service1. The connection manager 122 also determines that a service object already exists for Service1. Therefore, the connection manager 122 creates/adds a down-stream client object entry 730 and a session object entry 724 for EUD2. Because flow object entry 718 already exists for Flow1, the connection manager 122 links the Flow1 object entry 718 to the session object entry 724 associated with EUD2, as shown by the arrow in FIG. 7.

The connection manager 122 further determines that the request received from EUD2 is a redundant request based on the information parsed from the request received from EUD2, the ground rules, the service rules, and the state information 700. Stated differently, the connection manager 122 determines that at least one other requestor device, EUD1, is currently receiving the content stream Flow1 of Service1 that was requested by EUD2. The connection manager 122 assigns a secondary role to EUD2 in the down-stream client object entry 730 associated with EUD2 and optimizes the delivery of Flow1 to EUD2. In this example, the connection manager 122 replicates the content stream Flow1 of Service1 being received from the content server 102 for EUD1, at T11. If Flow1 is being maintained in a content flow queue, the connection manager 122 can locally replicate Flow1 from the content queue. The connection manager 122 then sends this replicated content stream to EUD2, at T12. This optimization prevents the request from EUD2 from passing to the content server 102, which would generate a separate link with EUD2. Therefore, only a single link/connection is required to be established by the content server 102 for delivering Flow1 to multiple users. This saves computing and bandwidth resources at the content server 102, and between the content server 102 and network nodes comprising the connection manager 122, while still providing a satisfactory user experience at the requestor devices.

FIG. 8 also shows that a third request is received by the connection manager 122 from a third requestor device 118 (EUDN), at T13. In this example, EUDN is requesting FlowN from Service 1. The connection manager 122 performs operations similar for this request. In particular, the connection manager 122 determines that EUDN is requesting the same service as EUD1 and EUD2, but is also requesting a different content stream, FlowN, from Service1. Therefore, because a service object 702 already exists for Service1, the connection manager 122 adds the appropriate object entries within the state information 700 for EUDN. The connection manager 122 assigns a primary role to EUDN since it is the first client to request FlowN of Service 1, as shown in the down-stream client object entry 734 of EUDN in FIG. 7. Because the connection manager 122 determines that this is not a redundant request, the connection manager 122 passes the request to the content server 102, at T14. The content server 102 processes the request and sends a response to EUDN, which is intercepted by the connection manager 122, at T15. The connection manager 122 determines, based on the state information 700, that EUDN is currently the only client that has requested FlowN of Service1. The connection manager 122 sends content stream FlowN from Service1 to EUDN, at T16.

In some embodiments, a request for a different content stream of a service can be considered redundant as long as the same service has been previously requested, irrespective of the content flow/stream being requested. In such embodiments, the connection manager 122 can receive multiple content streams from a streaming service over a single link. Therefore, the connection manager 122 can capture different content flows/streams from a single link established with the content server 102 for a single service and perform the optimization steps.

Figure 9:
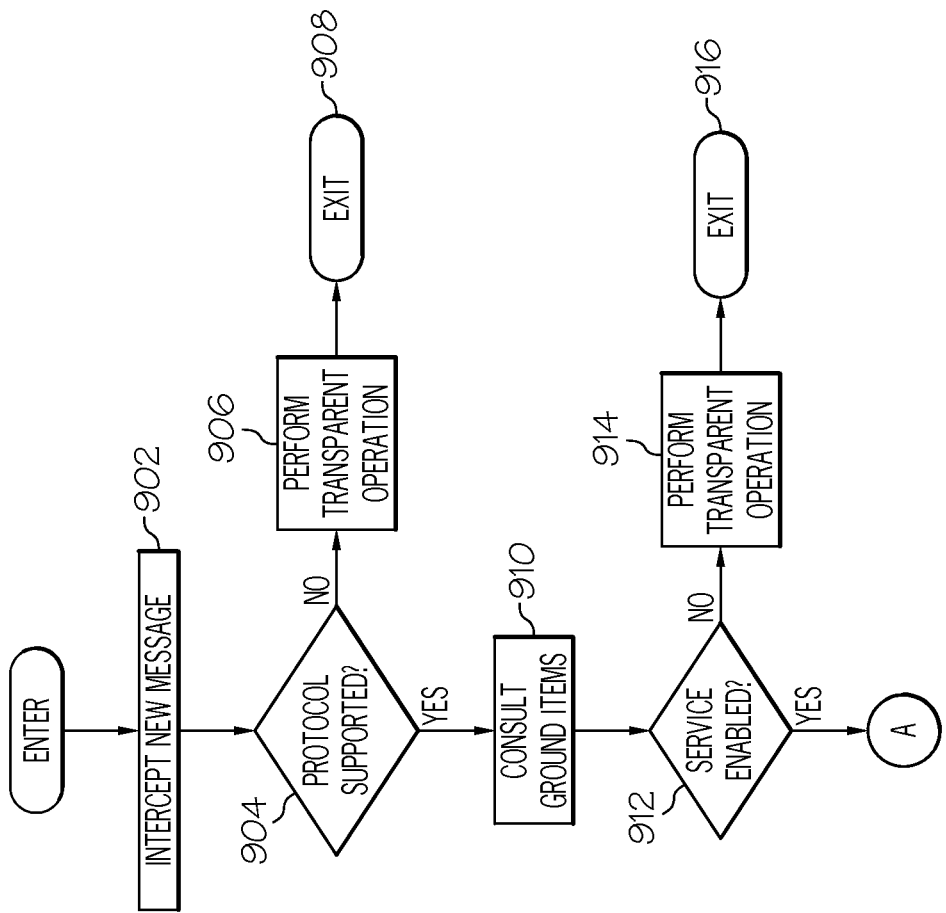
FIGS. 9 and 10 are operational flow diagrams illustrating optimized delivery of a media streaming service according to one embodiment of the present invention.
Figure 10:
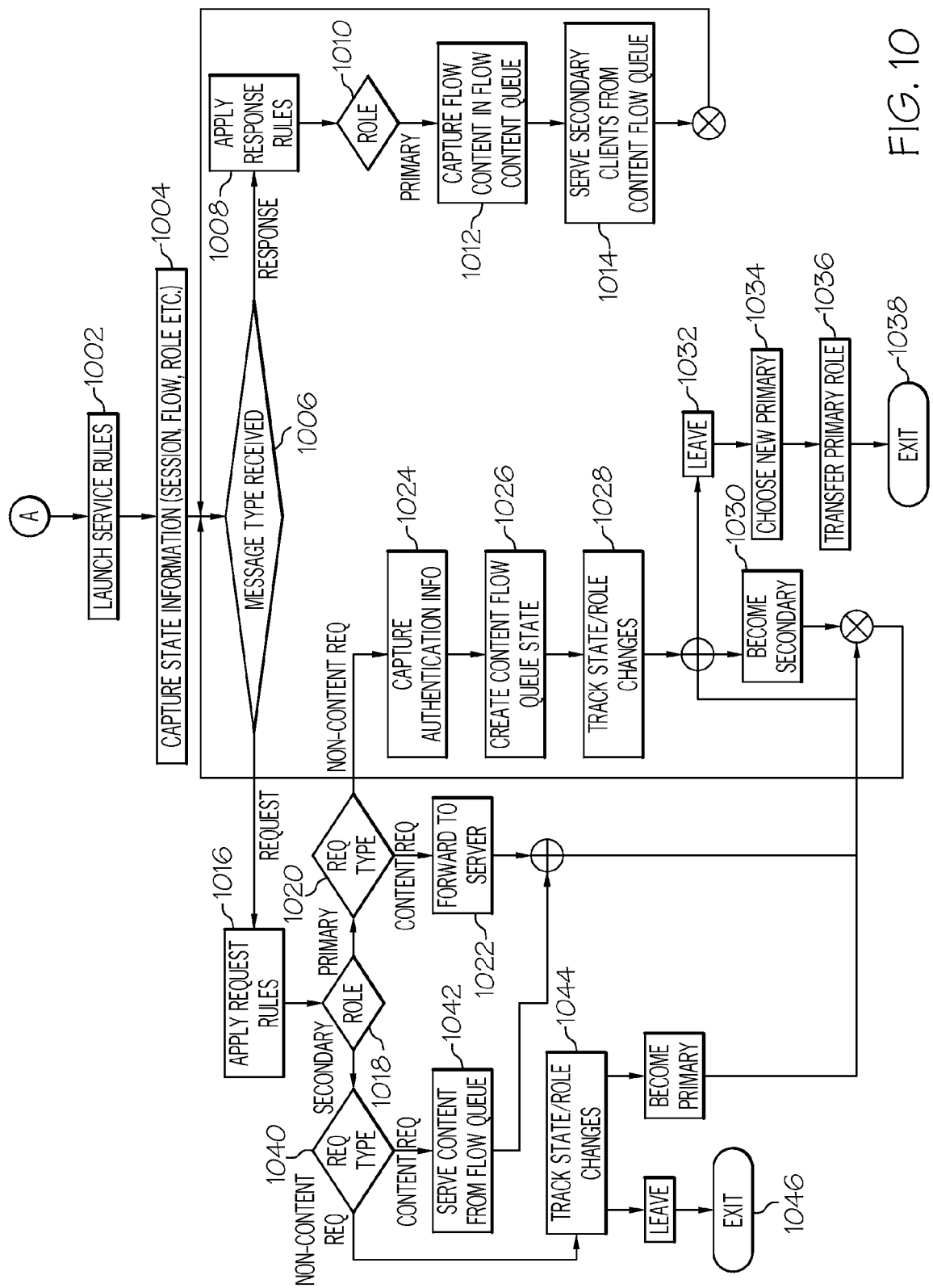

FIGS. 9 and 10 are operational flow diagrams illustrating optimization of the delivery of media streaming services according to one embodiment of the present invention. The connection manager 122 intercepts/receives a new message, at step 902. The connection manager 122 determines if the communication protocol of the request is supported, at step 904. If the communication protocol is not supported, the connection manager 122 performs one or more transparent operations such as passing the message on to the content server 102 (or the requestor device 112), at step 906. The control flow then exits at step 908. If the communication protocol is supported, the connection manager 122 applies one or more ground rules to the message, at step 910.

The connection manager 122 then determines if delivery optimization is enabled for the media streaming service associated with the message, at step 912. If delivery optimization is not enabled, the connection manager 122 performs one or more transparent operations such as passing the message onto the content server 102 (or the requestor device 112), at step 914. The control flow then exits at step 916. If delivery optimization is enabled, the connection the control flows to entry point A of FIG. 10. The steps shown in FIG. 10 are performed for each service that is registered for delivery optimization (multi-tenancy).

The connection manager 122 applies/executes one or more service rules associated with the specific media streaming service associated with the message, at step 1002. The connection manager 122 captures information to create service state information 212 such as session, flow, and role information, at step 1004. The connection manager 122 determines whether the received message is a response or a request message, at step 1006. If the received message is a response message, the connection manager 122 applies the appropriate response service rules for the media streaming service associated with the message, at step 1008. Because optimization is enabled, the connection manager 122 only receives a response from the content server 102 for a first requestor of the media streaming service since the connection manager 122 does not pass redundant requests for the media streaming service to the content server 102. Therefore, the connection manager 122 determines that the requestor device 112 requesting the media streaming service is a primary client, at step 1010. The connection manager 122 captures the content flow/stream from the content server 102 to the primary requestor device 112 and stores this flow within a content flow queue, at step 1012. The connection manager 122 then serves any subsequent requestors (secondary clients) of the media streaming service from this content flow queue, at step 1014. The flow then returns to step 1006.

If the message received is a request from a requestor device 112, the connection manager 122 applies the appropriate request service rules for the media streaming service associated with the message, at step 1016. The connection manager 122 then determines the role of the requestor device 112, at step 1018. If the requestor device 112 is a primary client, the connection manager 122 determines the request type, at step 1020. As discussed above, the request can be for a "push" media streaming service where the requestor device is not required to request content since the content is pushed out to the device, or a "pull" media streaming service where requestor devices are required to send explicit requests for content to the service. The type of service being requested in FIG. 10 is a "pull" media streaming service for purposes of illustration. Therefore, the connection manager 122 determines if the request is a request for content or a non-content request, which identifies the requested service, the requested content flow/stream, etc.

If the connection manager 122 determines that a primary client has sent a content request, the connection manager 122 forwards the request to the content server 102, at step 1022. The control flow then returns to step 1006. If the connection manager 122 determines that a primary client has sent a non-content request, the connection manager 122 captures authentication information from the request, at step 1024. The connection manager 122 creates a content flow queue state (e.g., a flow object), at step 1026. The connection manager 122 also tracks state/role changes, at step 1028. For example, a primary client can become a secondary client, at step 1030. A primary client can also leave or disconnect from the service or content flow/stream, at step 1032. If this occurs, the connection manager 122 selects a new primary client and transfers the primary role to the selected client, at steps 1034 and 1036, respectively. This tracking information is maintained within the service state information 212. The control flow then exits at step 1038.

Returning to step 1018, if the connection manager 122 determines that the requestor device is a secondary client, the connection manager 122 also determines the request type, at step 1040. If the request type is a content request, the connection manager 122 serves the content flow that has been captured in the flow/stream queue, at step 1042. Stated differently, the connection manager 122 replicates the content flow/stream being received by the primary client and sends this replicated content flow to the secondary client. The control flow then returns to step 1006. If the request is a non-content request, the connection manager 122 tracks the state/role changes associated with this secondary client, at step 1044. If the secondary client leaves/disconnects from the service or content flow/stream the control flow exits, at step 1046. If the secondary client becomes a primary client then the control flow returns to step 1006.

FIG. 11 is an operational flow diagram illustrating optimization of the delivery of media streaming services according to another embodiment of the present invention. The connection manager 122 intercepts a request from a first client device for a media streaming service available from the at least one content service provider, at step 1102. The connection manager 122 determines if the media streaming service is registered for delivery optimization based on at least one service rule specific to the media streaming service, at step 1104. The connection manager 122, responsive to the media streaming service being registered, determines if a second requestor device is currently receiving the media streaming service from the content service provider, at step 1106. The connection manager 122, responsive to the media streaming service being currently received, performs delivery optimization of the media streaming service by replicating the media streaming service for delivery to the first requestor device, at step 1108. The connection manager 122 sends the replicated media streaming service to the first requestor device, at step 1110. The control flow exits at step 1112.

FIG. 12 shows a schematic of an exemplary information processing system 1202 for use in embodiments of the present invention. Information processing system 1202 is only one example of a suitable system and is not intended to limit the scope of use or functionality of embodiments of the present invention described above. The exemplary information processing system 1202 is capable of implementing and/or performing any of the functionality set forth above.

The information processing system 1202 can be a networking node/element such as (but not limited to) the end network nodes 108 and 110, the edge network element 106, a personal computer system, a server computer system, a thin client, a thick client, a hand-held or laptop device, a tablet computing device, a multiprocessor system, a microprocessor-based system, a set top box, a programmable consumer electronic, a network PC, a minicomputer system, a mainframe computer system, a distributed cloud computing system, or the like.

As illustrated in FIG. 12, the information processing system 1202 is in the form of a general-purpose computing device. The components of the information processing system 1202 can include, but are not limited to, one or more processors or processing units 1204, a system memory 1206, and a bus 1208 that couples various system components including the system memory 1206 to the processor 1204.

The bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 1202 typically includes a variety of computer system readable media. Such media may be any available media that is accessible by the information processing system 1202, and it includes both volatile and non-volatile media, removable and non-removable media.

The system memory 1206, in one embodiment, comprises the connection manager 122 and its components, the content service provider information 210, the service state information 212, and the rules base 214 and rules 216. These one or more components can also be implemented in hardware. The system memory 1206 can include computer system readable media in the form of volatile memory, such as random access memory (RAM) 1210 and/or cache memory 1212. The information processing system 1202 can further include other removable/non-removable, volatile/non-volatile computer system storage media. By way of example only, a storage system 1214 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1208 by one or more data media interfaces. The memory 1206 can include at least one program product having a set of program modules that are configured to carry out the functions of an embodiment of the present invention.

Program/utility 1216, having a set of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of embodiments of the present invention.

The information processing system 1202 can also communicate with one or more external devices 1220 such as a keyboard, a pointing device, a display 1222, etc.; one or more devices that enable a user to interact with the information processing system 1202; and/or any devices (e.g., network card, modem, etc.) that enable the information processing system 1202 to communicate with one or more other computing devices. Such communication can occur via I/O interfaces 1224. Still yet, the information processing system 1202 can communicate with one or more networks such as a local area network (LAN), a general wide area network (WAN), and/or a public network (e.g., the Internet) via network adapter 1226. As depicted, the network adapter 1226 communicates with the other components of information processing system 1202 via the bus 1208. Other hardware and/or software components can also be used in conjunction with the information processing system 1202. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with a network node, for optimizing content delivery in a network, the network comprising the network node communicatively coupled between a plurality of end user devices and at least one content service provider, the method comprising:

intercepting, at the network node, a request from a first requestor device for a media streaming service available from a content service provider;

determining, by the network node, if the media streaming service is registered for delivery optimization based on at least one service rule that is specific to the media streaming service;

based on determining that the media streaming service is registered, determining, by the network node, if a second requestor device is currently receiving the media streaming service from the content service provider;

based on determining that the media streaming service is currently received, performing delivery optimization of the media streaming service by replicating the media streaming service for delivery to the first requestor device;

sending the replicated media streaming service from the network node to the first requestor device;

identifying a service object representing the media streaming service from a plurality of service state information, the service object comprising at least a flow object comprising an identifier of a unique content stream of the media streaming service, a first session object identifying a first session that has been established for the second requestor device to receive the unique content stream, and a first requestor object comprising a unique identifier of the second requestor device and an indication that the second requestor device is a first requestor of the media streaming service or a subsequent requestor of the media streaming service;

adding a second requestor object associated with the first requestor device to the service object, the second requestor object comprising a unique identifier of the first requestor device and an indication that the first requestor device requested the media streaming service subsequent to the second requestor device; and adding a second session object associated with the first requestor device to the service object, the second session object identifying a second session that has been established for the first requestor device to receive the unique content stream identified in the flow object.

2. The method of claim 1, wherein the second requestor device is currently receiving the media streaming service over a first communication link that connects the content service provider and the second requestor device, and the replicated media streaming service is sent to the first requestor device over a second communication link that connects the network node and the first requestor device.

3. The method of claim 1, wherein determining if the media streaming service is registered comprises:
   identifying at least one condition within the at least one service rule;
   obtaining at least one value from the request;
   determining if the value satisfies the condition;
   based on determining that the value satisfies the at least one condition, determining if the media streaming service is registered for delivery optimization; and
   based on determining that the value fails to satisfy the at least one condition, determining that the media streaming service is not registered for delivery optimization.

4. The method of claim 3, wherein the at least one condition is at least one of a required service identifier and a required content service provider.

5. The method of claim 1, wherein determining if the second requestor device is currently receiving the media streaming service comprises:
   analyzing the set of service state information;
   determining if the set of service state information comprises the service object representing the media streaming service;
   based on determining that the set of service state information comprises the service object, determining that the second requestor device is currently receiving the media streaming service; and
   based on determining that the set of service state information does not comprise the service object, determining that the second requestor device is not currently receiving the media streaming service.

6. The method of claim 5, wherein determining that the second requestor device is currently receiving the media streaming service further comprises determining if the first requestor object identifies the second requestor device as a first requestor of the media streaming service.

7. The method of claim 1, further comprising:
   based on determining that the media streaming service is not registered, passing the request from the network node to the content service provider.

8. The method of claim of claim 1, further comprising:
   intercepting, at the network node, a second request from a third requestor device for a second media streaming service from the content service provider;
   determining, by the network node, if the second media streaming service is registered for delivery optimization;
   based on determining that the second media streaming service is registered, determining, by the network node, if a fourth requestor device is currently receiving the second media streaming service from the content service provider;
   based on determining that the second media streaming service is currently received, performing delivery optimization of the second media streaming service by replicating the second media streaming service for delivery to the third requestor device; and
   sending the replicated second media streaming service from the network node to the third requestor device.

9. An information processing system for optimizing content delivery in a network, the information processing system comprising:
   a memory;
   a processor communicatively coupled to the memory; and
   a connection manager communicatively coupled to the processor and the memory, wherein the connection manager is configured to perform a method comprising:
      intercepting a request from a first requestor device for a media streaming service available from a content service provider;
      determining if the media streaming service is registered for delivery optimization based on at least one service rule that is specific to the media streaming service;
      based on determining that the media streaming service is registered, determining if a second requestor device is currently receiving the media streaming service from the content service provider;
      based on determining that the media streaming service is currently received, performing delivery optimization of the media streaming service by replicating the media streaming service for delivery to the first requestor device;
      sending the replicated media streaming service to the first requestor device;
      identifying a service object representing the media streaming service from a plurality of service state information, the service object comprising at least a flow object comprising an identifier of a unique content stream of the media streaming service, a first session object identifying a first session that has been established for the second requestor device to receive the unique content stream, and a first requestor object comprising a unique identifier of the second requestor device and an indication that the second requestor device is a first requestor of the media streaming service or a subsequent requestor of the media streaming service;
      adding a second requestor object associated with the first requestor device to the service object, the second requestor object comprising a unique identifier of the first requestor device and an indication that the first requestor device requested the media streaming service subsequent to the second requestor device; and
      adding a second session object associated with the first requestor device to the service object, the second session object identifying a second session that has been established for the first requestor device to receive the unique content stream identified in the flow object.

10. The information processing system of claim 9, wherein the second requestor device is currently receiving the media streaming service over a first communication link that connects the content service provider and the second requestor device, and
   the replicated media streaming service is sent to the first requestor device over a second communication link that connects the connection manager and the first requestor device.

11. The information processing system of claim 9, wherein determining if the media streaming service is registered comprises:
   identifying at least one condition within the at least one service rule;
   obtaining at least one value from the request;
   determining if the value satisfies the condition;
   based on determining that the value satisfies the at least one condition, determining if the media streaming service is registered for delivery optimization; and
   based on determining that the value fails to satisfy the at least one condition, determining that the media streaming service is not registered for delivery optimization.

12. The information processing system of claim 9, wherein determining if the second requestor device is currently receiving the media streaming service comprises:
- analyzing the set of service state information;
- determining if the set of service state information comprises the service object representing the media streaming service;
- based on determining that the set of service state information comprises the service object, determining that the second requestor device is currently receiving the media streaming service; and
- based on determining that the set of service state information does not comprise the service object, determining that the second requestor device is not currently receiving the media streaming service.

13. The information processing system of claim 9, wherein the method further comprises:
- based on determining that the media streaming service is not registered, passing the request to the content service provider.

14. The information processing system of claim 9, wherein the method further comprises:
- intercepting a second request from a third requestor device for a second media streaming service from the content service provider;
- determining if the second media streaming service is registered for delivery optimization;
- based on determining that the second media streaming service is registered, determining if a fourth requestor device is currently receiving the second media streaming service from the content service provider;
- based on determining that the second media streaming service is currently received, performing delivery optimization of the second media streaming service by replicating the second media streaming service for delivery to the third requestor device; and
- sending the replicated second media streaming service to the third requestor device.

15. A computer program product tangibly embodying computer readable non-transitory instructions which, when implemented, cause a computer to carry out the steps of a method for optimizing content delivery in a network, the method comprising:
- intercepting, at a network node, a request from a first requestor device for a media streaming service available from a content service provider;
- determining, by the network node, if the media streaming service is registered for delivery optimization based on at least one service rule that is specific to the media streaming service;
- based on determining that the media streaming service is registered, determining, by the network node, if a second requestor device is currently receiving the media streaming service from the content service provider;
- based on determining that the media streaming service is currently received, performing delivery optimization of the media streaming service by replicating the media streaming service for delivery to the first requestor device;
- sending the replicated media streaming service from the network node to the first requestor device;
- identifying a service object representing the media streaming service from a plurality of service state information, the service object comprising at least a flow object comprising an identifier of a unique content stream of the media streaming service, a first session object identifying a first session that has been established for the second requestor device to receive the unique content stream, and a first requestor object comprising a unique identifier of the second requestor device and an indication that the second requestor device is a first requestor of the media streaming service or a subsequent requestor of the media streaming service;
- adding a second requestor object associated with the first requestor device to the service object, the second requestor object comprising a unique identifier of the first requestor device and an indication that the first requestor device requested the media streaming service subsequent to the second requestor device; and
- adding a second session object associated with the first requestor device to the service object, the second session object identifying a second session that has been established for the first requestor device to receive the unique content stream identified in the flow object.

16. The computer program product of claim 15, wherein the second requestor device is currently receiving the media streaming service over a first communication link that connects the content service provider and the second requestor device, and
- the replicated media streaming service is sent to the first requestor device over a second communication link that connects the network node and the first requestor device.

17. The computer program product of claim 15, wherein determining if the media streaming service is registered comprises:
- identifying at least one condition within the at least one service rule;
- obtaining at least one value from the request;
- determining if the value satisfies the condition;
- based on determining that the value satisfies the at least one condition, determining if the media streaming service is registered for delivery optimization; and
- based on determining that the value fails to satisfy the at least one condition, determining that the media streaming service is not registered for delivery optimization.

18. The computer program product of claim 15, wherein determining if the second requestor device is currently receiving the media streaming service comprises:
- analyzing a set of service state information;
- determining if the set of service state information comprises a service object representing the media streaming service;
- based on determining that the set of service state information comprises the service object, determining if the second requestor device is currently receiving the media streaming service; and
- based on determining that the set of service state information does not comprise the service object, determining that the second requestor device is not currently receiving the media streaming service.

19. The computer program product of claim 18, wherein determining that the second requestor device is currently receiving the media streaming service further comprises determining if the first requestor object identifies the second requestor device as a first requestor of the media streaming service.

20. The computer program product of claim 15, wherein the method further comprises:
- based on determining that the media streaming service is not registered, passing the request from the network node to the content service provider.

21. The computer program product of claim 15, wherein the method further comprises:

intercepting, at the network node, a second request from a third requestor device for a second media streaming service from the content service provider;
determining, by the network node, if the second media streaming service is registered for delivery optimization;
based on determining that the second media streaming service is registered, determining, by the network node, if a fourth requestor device is currently receiving the second media streaming service from the content service provider;
based on determining that the second media streaming service is currently received, performing delivery optimization of the second media streaming service by replicating the second media streaming service for delivery to the third requestor device; and
sending the replicated second media streaming service from the network node to the third requestor device.

* * * * *